United States Patent [19]

Inaba et al.

[11] Patent Number: 4,504,771
[45] Date of Patent: Mar. 12, 1985

[54] ROBOT CONTROL APPARATUS

[75] Inventors: Hajimu Inaba, Hino; Shinsuke Sakakibara, Komae, both of Japan

[73] Assignee: Fanuc Ltd., Minamitsuru, Japan

[21] Appl. No.: 451,160

[22] PCT Filed: Apr. 15, 1982

[86] PCT No.: PCT/JP82/00121
§ 371 Date: Dec. 7, 1982
§ 102(e) Date: Dec. 7, 1982

[87] PCT Pub. No.: WO82/03706
PCT Pub. Date: Oct. 28, 1982

[30] Foreign Application Priority Data

Apr. 15, 1981 [JP] Japan ................ 56-056444

[51] Int. Cl.³ .......................... G05B 13/00
[52] U.S. Cl. ........................ 318/561; 364/154
[58] Field of Search .......... 318/561, 568, 603, 601, 318/590; 364/152, 153, 150, 148, 149, 180, 167, 513, 154

[56] References Cited

U.S. PATENT DOCUMENTS 4,218,172 8/1980 Freund ................ 364/513 X
4,328,452 5/1982 Ragan ................ 318/561 X
4,362,978 12/1982 Pollard ............... 364/513 X

FOREIGN PATENT DOCUMENTS 53-75664 7/1978 Japan.
56-33704 4/1981 Japan.

Primary Examiner—J. V. Truhe
Assistant Examiner—Patrick C. Keane
Attorney, Agent, or Firm—Staas & Halsey

[57] ABSTRACT

Disclosed is a robot control apparatus which drives a rotational drive unit (103) for rotating a robot arm about an axis of rotation. The robot control apparatus includes a rotational speed decision unit (SJC) to assure that the rotational speed of the robot arm driven by the rotational drive unit (103) will not exceed a maximum allowable speed. The rotational speed decision unit (SJC) is adapted to compute an allowable rotational speed (Ft) for an input arm length (Ra), compare the computed allowable rotational speed (Ft) with an input speed (Fin), and produce, as a commanded speed (Fc), the smaller of the two compared speeds.

8 Claims, 3 Drawing Figures

FIG. IA
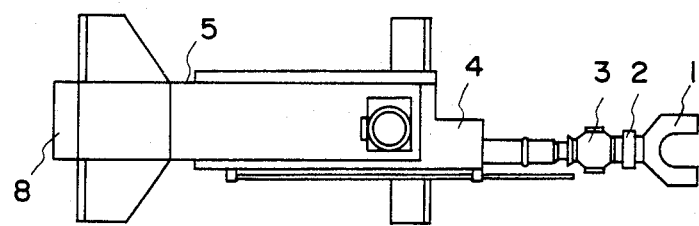
FIG. IB
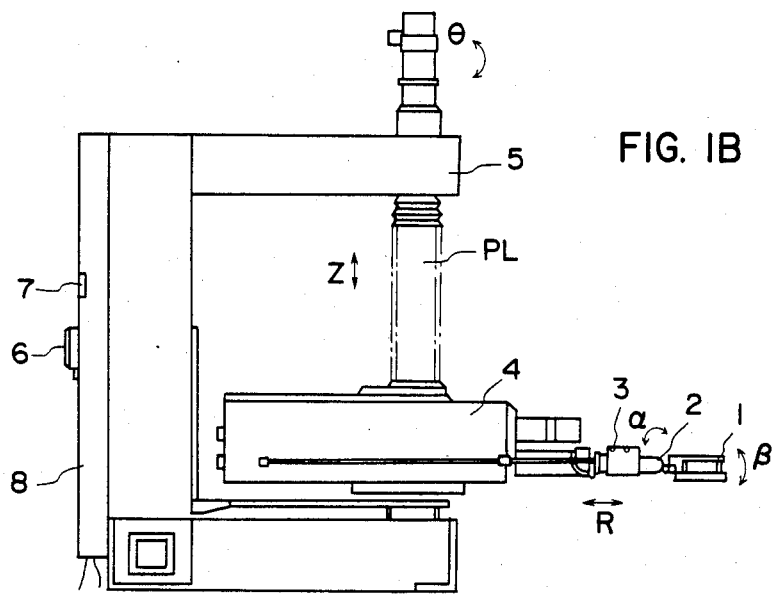

ROBOT CONTROL APPARATUS

BACKGROUND OF THE INVENTION

This invention relates to a robot control apparatus for controlling an industrial robot having a rotatable-type arm and, more particularly, to a robot control apparatus wherein an excessive force is prevented from being applied to the arm when the arm is rotated.

The rising cost of labor has given rise to a demand for labor-saving measures and for improvement in work procedures. Industrial robots have been put into use to meet this demand and have been very successful in doing so. Particularly outstanding results have been achieved in plants having numerous machine tools where industrial robots are used to perform such simple services as changing the workpieces and tools associated with each machine tool. The demand for such robots has grown yearly. FIGS. 1A and 1B illustrate an industrial robot of the type described, in which FIG. 1A is a plan view and FIG. 1B a side view. FIGS. 1A and 1B, numeral 1 denotes a mechanical hand for gripping a workpiece when, for example, it is to be exchanged, numeral 2 denotes a wrist which is capable of being swiveled ($\alpha$-axis) and bent up and down ($\beta$-axis), numeral 3 denotes an arm which can be freely extended and retracted (R-axis), and numeral 4 denotes a casing which can be moved vertically (Z-axis) along a shaft PL and rotated ($\theta$-axis). Numeral 5 denotes a frame, 6 a teaching box for teaching robot motions, 7 an operator's panel for manipulation by the operator, and 8 a control unit for storing, in succession, the data input through the teaching box 6, such as the operating position (point), operating speed and the various services, and for controlling the motion of the mechanical hand 1, wrist 2, arm 3 and casing 4 in accordance with the data input through the teaching box 6.

In playback type industrial robots, the teaching box 6 is used to define the service operations in advance, and the data input through the teaching box 6 (referred to as robot instruction data hereinafter) is stored in a memory within the control unit 8. Whenever a request for service is received by the robot, a series of robot instruction data is read from the memory sequentially, and the robot responds by servicing the machine.

Extending the arm 3 of the robot increases the moment of the force associated with the axis of rotation ($\theta$-axis). Therefore, when the casing 4 of the arm 3 is rotated at high speed while the arm 3 is extended, an excessive force acts upon the drive unit associated with the axis of rotation and upon other units as well and can cause damage to the robot. The maximum speed set forth in a robot's specifications pertains to rotation when the arm 3 is in the fully retracted state. A considerable excessive force acts upon the robot when an attempt to rotate the arm 3 at the maximum speed while the arm 3 is extended and gripping a heavy load occurs. One specific example of robot damage is wear sustained by a reduction mechanism within the rotational axis drive unit when motion about the $\theta$-axis is started and stopped.

In order to prevent the arm 3 and drive units from being acted upon by the excessive force, it is conventional practice to provide means for inputting a low-speed command when the casing 4 is to be rotated with the arm 3 extended. However, it is troublesome to find suitable values for the speed command during the teaching operation, and difficulty is encountered in selecting a suitable speed command in a case where movement about the $\theta$-axis and along the R-axis occurs simultaneously. In such a case the maximum safe speed is constantly changing.

SUMMARY OF THE INVENTION

Accordingly, an object of the present invention is to provide a robot control apparatus which can be instructed without extra difficulty, yet enables the arm to be rotated at an allowable rotational speed, based upon the length of the robot arm without subjecting the arm and drive units to excessive forces.

In accordance with the present invention, in order to control the motion of an industrial robot wherein an arm extendable in the longitudinal direction is rotated about an axis of rotation by a rotational drive unit, there is provided a decision unit which computes an allowable rotational speed in accordance with the arm length. The decision unit is included in a robot control apparatus which produces a drive signal for a rotational drive unit based on robot instruction data for a given position and speed. The decision unit compares the speed input as robot instruction data with the computed allowable rotational speed, and delivers, as a commanded speed, the slower of the two compared speeds. The commanded speed from the rotational speed decision unit is applied as an input to a drive circuit to obtain the drive signal. Since the operating speed of the rotational drive unit does not exceed the allowable rotational speed computed in accordance with the arm length, the rotational drive and other units are not subjected to excessive forces during rotation of the arm and damage to the robot is avoided. Since the allowable rotational speed is decided in accordance with the arm length, the speed at which the arm rotates is not slowed more than necessary.

BRIEF DESCRIPTION OF THE DRAWINGS

FIG. 1A is a plan view and FIG. 1B is a side view of a robot which operates in a cylindrical coordinate system and to which the present invention appertains.

DESCRIPTION OF THE PREFERRED EMBODIMENT

Figure 2:
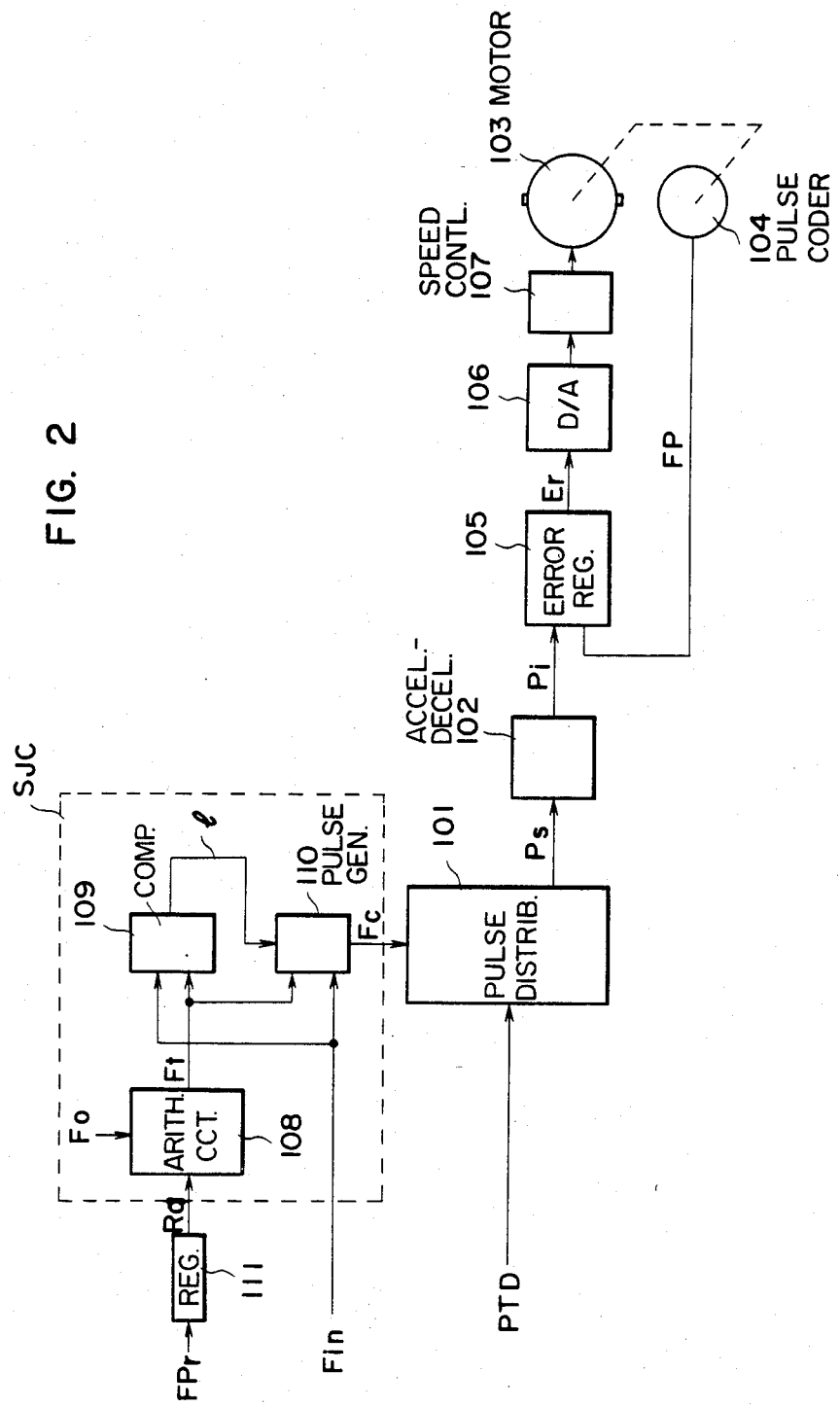
FIG. 2 is a block diagram illustrating an embodiment of a robot control apparatus according to the present invention.

An embodiment of the present invention will now be described in detail with reference to the drawings, FIG. 2 is a block diagram illustrating an embodiment of the present invention. In FIG. 2, numeral 101 denotes a pulse distributing circuit which executes a well-known pulse distribution operation on the basis of a command PTD indicating robot position having a speed command Fc, for generating distributed pulses Ps and a frequency corresponding to the speed command Fc. Numeral 102 denotes a well-known accelerating-decelerating circuit for linearly accelerating the pulse rate of the distributed pulse train Ps when the pulse train Ps is generated and for linearly decelerating the pulse train Ps when the pulse train Ps ends, thereby producing a pulse train Pi. Designated at 103 is a DC motor for rotating the arm 3. Numeral 104 denotes a pulse coder for generating a feedback pulse FP whenever the DC motor 103 rotates by a predetermined amount, and 105 an error register comprising a reversible counter or the like for computing and storing an error Er between the number of feedback pulses FP and the number of input pulses Pi generated by the accelerating-decelerating circuit 102.

By way of example, let us assume that the arm 3 is moving in the positive direction about $+\theta$-axis. In such a case, the content of the error register 105 is incremented each time an input pulse Pi is generated and decremented each time a feedback pulse FP is generated. The error registor 105 stores the error Er between the number of input pulses and feedback pulses FP. Numeral 106 denotes a digital to analog (DA) converter for generating an analog voltage that is proportional to the content of the error register 105 and 107 denotes a speed control circuit. An arithmetic circuit 108 performs the following operation to compute the allowable rotational speed Ft for a robot arm length Ra:

$$Ft = (R_{max} + k) \cdot Fo/(Ra^2 + k) \quad (1)$$

where $R_{max}$ represents maximum arm length, namely the length of the arm 3 when fully extended, k designates a constant and Fo the allowable speed at full extension of the arm 3. The allowable rotational speed Fo at full extension may be obtained from the total time constant To of the accelerating-decelerating circuit and servo system, the inertia Jo about the axis of rotation when the arm 3 is fully extended, and the maximum strength of the reduction mechanism. The general relation is expressed as follows:

$$J_{max} \cdot Fo/To = Co \quad (2)$$

The left side of Eq. (2) represents the force on the reduction mechanism when the arm 3 is fully extended. Eq. (2) is established up by setting this force equal to the maximum strength Co. From Eq. (2), the allowable rotational speed at full extension may be written:

$$Fo = Co \cdot To/J_{max} \quad (3)$$

The constant k/2 is obtained from: $(R_{max}+k)/(R_{min}^2+k) \approx J_{max}/J_{min}$ (4)
In Eq. (4), $R_{min}$ represents the minimum arm length, namely when the arm 3 is fully retracted, and $J_{min}$ represents the inertia about the axis of rotation when the arm 3 is fully retracted. Since the inertia about the axis of rotation generally is proportional to the square of the arm length, the numerator on the left side of Eq. (4) represents the inertia at maximum arm length, while the denominator represents the inertia at minimum arm length. Accordingly, k may be obtained from Eq. (4) by measuring maximum inertia $J_{max}$, minimum inertia $J_{min}$, maximum arm length $R_{max}$ and minimum arm length $R_{min}$.

Numeral 109 denotes a comparator for comparing, in terms of magnitude, a rotational speed Fin input as part of the robot instruction data and the rotational speed Ft obtained from Eq. (1), and for outputting a decision signal having logical "1" on line 1 when Fin<Ft holds. Numeral 110 denotes a pulse generator for generating a pulse train Fc having a frequency in which is proportional to the smaller of of the speeds Fin and Ft. Thus, Fc is expressed by:

$$Fc = min\{Fin, Ft\} \quad (5)$$

Accordingly, if the input speed Fin is less than the allowable rotational speed Ft, then a pulse train based on the input speed Fin enters the pulse distributor 101. A pulse train based on the allowable rotational speed Ft will be applied to the pulse distributor 101 when the input speed Fin is greater than the allowable speed Ft. The arithmetic circuit 108, comparator 109 and pulse generator 110 are included in a rotational speed decision unit SJC. Numeral 111 designates an R-axis present position register for recording the arm position (current arm length Ra) along the R-axis by incrementing and decrementing, in accordance with the direction of movement, each feedback pulse FPr which is generated whenever an R-axis motor (not shown) rotates by a predetermined amount.

The operation of the arrangement shown in FIG. 2 will now be described. The arithmetic circuit 108 repeatedly executes the operation of Eq. (1) to compute the allowable rotational speed Ft for the currently prevailing arm length Ra. Accordingly, when the input data PTD indicating rotational of position in the direction and the input speed Fin are delivered by a memory (not shown) located in the robot control apparatus, the comparator 109 compares the allowable rotational speed Ft and input speed Fin. If the following inequality holds, then logical "1" is delivered on line 1:

$$Fin < Ft \quad (6)$$

and the pulse generator 110 generates a pulse train the frequency of which corresponds to the input speed Fin obtained from the memory. As a result, the pulse distributor 101 begins a pulse distribution operation on the basis of the input positional data PTD to produce distributed pulses Ps of a frequency corresponding to the input speed Fin. Upon receiving the distributed pulse train as an input thereto, the accelerating-decelerating circuit 102 produces the pulse train Pi, the frequency of which varies linearly from zero to Fin when the distributed pulse train starts and varies linearly from Fin to zero when the pulse train stops.

The error register 105 adds the pulses in pulse train Pi to its content Er each time one of the pulses arrives, said content Er steadily increasing in value. On the other hand, when the error Er is input to the DA converter 106, the DC motor 103 begins rotating as signals are output by the DA converter 106 and speed control circuit 107. The pulse coder 104 produces a single feedback pulse FP each time the DC motor 103 rotates by a predetermined amount. The generated feedback pulses FP are applied to the error register 105, decrementing the content Er. The result is that the content Er of the error register 105 increases in numerical value exponentially at the start of the pulse train Ps, attains a constant value when a steady state has been achieved, and decreases exponentially when the pulse train Ps stops. The rotational speed of the DC motor 103 also increases and decreases exponentially.

If the arm 3 is being extended while rotating under a condition where the inequality (6) is satisfied, then the allowable rotational speed Ft expressed by Eq. (1) will gradually decrease. When a certain arm length is surpassed, the relation:

$$Fin \geq Ft \quad (7)$$

will be established and sensed by the comparator 109, so that the pulse generator 110 generates, from this point on, a pulse train the frequency of which is based on the allowable rotational speed Ft. As a result, the rotational speed of the DC motor 103 subsequently decreases gradually in accordance with the extension of the arm 3.

In other words, the arm 3 will not rotate at a speed above the allowable rotational speed.

If the arm 3 is being retracted while rotating under a condition where the relation (7) is satisfied, then the allowable rotational speed Ft given by Eq. (1) will gradually increase. When the arm length falls below a certain value, the inequality:

$$Fin < Ft$$

will be established, with the result that the arm will thereafter rotate at the commanded speed. That is, the arm 3 will rotate at the input speed when the input speed is less than the allowable rotational speed.

In accordance with the present invention as described above, the rotational speed of a robot arm 3 will not exceed an allowable rotational speed based on a prescribed arm length, assuring that the arm 3 and drive units will not be subjected to excessive force. The present invention enables the foregoing control operation to be achieved with a simple construction.

What is claimed is:

1. A robot control apparatus, producing a drive signal for a rotational drive unit based on commands defining position and speed, for controlling an industrial robot having an arm extendable in the longitudinal direction and rotatable about an axis of rotation by the rotational drive unit, said robot control apparatus comprising:
    a rotational speed decision unit, operatively connected to receive a current arm length and an input speed, for computing an allowable rotational speed of said arm in accordance with the current arm length, for comparing the input speed with the computed allowable rotational speed, and for delivering, as a commanded speed, the slower of the input and computed allowable rotational speeds; and
    a drive circuit, operatively connected to said rotational speed decision unit and to receive the input position data, for producing the drive signal from the commanded speed delivered by said rotational speed decision unit and the input position data.

2. A robot control apparatus according to claim 1, further comprising a register, operatively connected to said rotational speed decision unit and to receive the current arm length, for storing the current arm length as the arm is extended and retracted.

3. A robot control apparatus according to claim 1 or claim 2, wherein said drive circuit comprises:
    a pulse distributor, operatively connected to said rotational speed decision circuit and to receive the input position data, for producing a distributed pulse train from the commanded speed and input position data; and
    a drive signal generating circuit, operatively connected to said pulse distributor, for generating a drive signal from the distributed pulse train produced by said pulse distributor.

4. A robot control apparatus according to claim 1 or claim 2, wherein said rotational speed decision unit computes the allowable rotational speed on the basis of the current arm length, the maximum length of the arm, and the allowable rotational speed for the maximum length of the arm.

5. A robot control apparatus according to claim 4, wherein said rotational speed decision unit comprises:
    an arithmetic circuit, operatively connected to receive the current arm length, for computing the allowable rotational speed;
    a comparator, operatively connected to said arithmetic circuit and to receive the input speed, for comparing the input speed and the allowable rotational speed; and
    a pulse generator, operatively connected to said drive circuit, said arithmetic circuit, said comparator and to receive the input speed, for delivering the input speed or the allowable rotational speed as the commanded speed in dependence upon the comparison.

6. A robot control apparatus according to claim 3, wherein said rotational speed decision unit computes the allowable rotational speed on the basis of the current arm length, the maximum length of the arm, and the allowable rotational speed for the maximum length of the arm.

7. A robot control apparatus according to claim 6, wherein said rotational speed decision unit comprises:
    an arithmetic circuit, operatively connected to receive the current arm length, for computing the allowable rotational speed;
    a comparator, operatively connected to said arithmetic circuit and to receive the input speed, for comparing the input speed and the allowable rotational speed; and
    a pulse generator operatively connected to said drive circuit, said arithmetic circuit, said comparator and to receive the input speed, for delivering the input speed or the allowable rotational speed as the commanded speed in dependence upon the comparison.

8. A robot control apparatus according to claim 1, wherein the allowable rotational speed is computed in accordance with the square of the maximum arm length multiplied by the allowable rotational speed for the maximum arm length divided by the square of the current arm length.

* * * * *

UNITED STATES PATENT AND TRADEMARK OFFICE
CERTIFICATE OF CORRECTION

PATENT NO. : 4,504,771
DATED : March 12, 1985
INVENTOR(S) : Inaba et al.

It is certified that error appears in the above-identified patent and that said Letters Patent is hereby corrected as shown below:

Column 3, line 17, equation 1, "$R_{max}$" should be --$R_{max}^2$--;

line 39, "$R_{max}$" should be --$R_{max}^2$--.

Signed and Sealed this

Twenty-ninth Day of September, 1987

Attest:

DONALD J. QUIGG

*Attesting Officer*   *Commissioner of Patents and Trademarks*